A. OLIER.
MACHINE FOR DECORTICATING FRUIT HAVING A HARD SHELL.
APPLICATION FILED NOV. 7, 1913.
1,187,774.
Patented June 20, 1916.
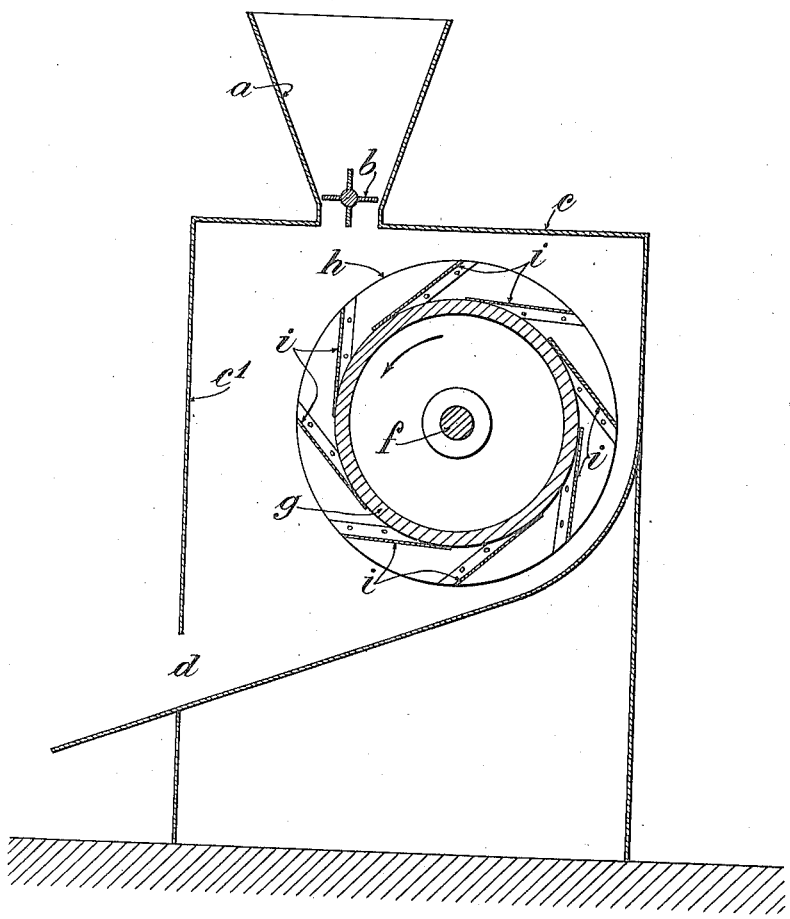
WITNESSES:
John C. Sanders
Albert F. Henman
INVENTOR
André Olier
BY Wm Wallace White
ATT'Y

UNITED STATES PATENT OFFICE.

ANDRÉ OLIER, OF USINES ST.-REMY, CLERMONT-FERRAND, FRANCE, ASSIGNOR TO SOCIÉTÉ A. OLIER & CIE., OF USINES ST.-REMY, CLERMONT-FERRAND, FRANCE.

MACHINE FOR DECORTICATING FRUIT HAVING A HARD SHELL.

1,187,774.      Specification of Letters Patent.    Patented June 20, 1916.

Application filed November 7, 1913. Serial No. 799,661.

*To all whom it may concern:*

Be it known that I, ANDRÉ OLIER, a citizen of the Republic of France, residing at Usines St.-Remy, Clermont-Ferrand, Puy de Dôme, in the Republic of France, have invented new and useful Improvements in Machines for Decorticating Fruit Having a Hard Shell, of which the following is a specification.

This invention relates to a machine for decorticating fruit having a hard shell, such as palm nuts, in which the fruit fall vertically toward the periphery of a drum provided with blades and rotating at a high speed, the falling nuts being thus thrown by the rotating blades against an abutment plate.

The above machine has the advantage that it is not liable to become choked, its construction is very simple so far as the working parts and also the driving transmission are concerned and it permits also of obtaining a large output while being of a very compact construction.

The annexed drawing is a diagrammatical vertical section of a machine constructed according to the invention.

The machine shown in the drawing comprises a feed hopper $a$ mounted on a casing $c$ and provided with a rotary distributer $b$, which is rotated by any suitable means so that predetermined amounts of the nuts contained in the hopper are discharged into the casing of the apparatus. The casing $c$ is provided at the bottom with an opening $d$. Through the casing $c$, extends horizontally a shaft $f$ carrying a drum $g$ having at its ends two side plates $h$. Between the plates $h$, all around the drum, are arranged blades $i$, the lateral edges of which are turned at right angles and bolted or riveted to the side plates $h$. The blades $i$ are inclined on the radius of the drum and may be arranged as shown in a substantially tangential direction, the blades extending rearwardly with regard of the direction of rotation of the drum, which is shown by the arrow.

The drum is rotated by any suitable means and rotates at a speed of 1000 to 1500 revolutions per minute.

The nuts or other fruit placed into the hopper $a$ are discharged therefrom when the distributer $b$ rotates and fall toward the periphery of the drum $g$ so that the blades $i$ carried thereon, owing to their rapid movement of rotation strike suddenly the falling nuts and throw them forcibly against the opposite wall $c'$ of the casing which acts as an abutment plate. By means of the two blows imparted successively to the nuts, the shell thereof is broken and the shell and kernel fall together upon the bottom of the casing to be discharged through the opening $d$.

Having now described my invention, what I claim as new and desire to secure by Letters Patent is:

1. In a machine for decorticating fruit, a rotatable drum, blades projecting from the outer periphery of the drum, disposed tangentially thereto, and extending rearwardly with regard of the direction of rotation of the drum, an abutment plate arranged at one side of the drum and substantially parallel thereto, and means for discharging fruit toward the periphery of the drum at the same side of the drum as the abutment plate, substantially as described and for the purpose set forth.

2. In a machine for decorticating fruit, a rotatable drum, blades projecting from the outer periphery of the drum, disposed tangentially thereto and extending rearwardly with regard of the direction of rotation of the drum, an abutment plate arranged at one side of the drum and substantially parallel thereto, a hopper disposed above the space between the drum and the abutment plate and adapted to discharge fruit toward the periphery of the drum, and a rotating distributer arranged at the bottom of the hopper for regulating the discharge of fruit therefrom, substantially as described and for the purpose set forth.

In testimony whereof I have signed my name to this specification in the presence of two subscribing witnesses.

ANDRÉ OLIER.

Witnesses:
  LOUIS MOSES,
  FRANK H. MAXON.